United States Patent [19]

Chitayat

[11] Patent Number: 5,116,141
[45] Date of Patent: May 26, 1992

[54] ANTI-CREEP FOR BEARING RETAINERS

[76] Inventor: Anwar Chitayat, Duck Island, P.O. Box 107, Northport, N.Y. 11768

[21] Appl. No.: 607,813

[22] Filed: Nov. 1, 1990

[51] Int. Cl.$^5$ .............................................. F16C 29/04
[52] U.S. Cl. ...................................... 384/17; 384/49; 384/54; 384/57
[58] Field of Search ....................... 384/17, 18, 19, 49, 384/54, 57

[56] References Cited

U.S. PATENT DOCUMENTS

| | | | |
|---|---|---|---|
| 2,399,283 | 4/1946 | Moore | 384/17 |
| 2,646,323 | 7/1953 | Snyder | 384/17 |
| 3,722,964 | 5/1973 | Chitester et al. | 384/18 |
| 3,857,618 | 12/1974 | Hagen et al. | 384/18 |

*Primary Examiner*—Lenard A. Footland
*Attorney, Agent, or Firm*—Morrison Law Firm

[57] ABSTRACT

Apparatus for force restoration of a bearing retainer uses a loop of resilient line around a pulley at an end of the bearing retainer. One end of the loop attached to a slide and the other end is attached to a base of a positioning table. A second loop is similarly attached at the opposite end of the retainer. These loops apply equal tension to both ends of the bearing retainer as long as the bearing retainer remains in its proper position without creep. When the bearing retainer moves out of position, unequal forces are exerted by the two loops, with a resultant force in a direction necessary to return the bearing retainer to its proper position. This controls the position of the bearing retainer relative to the slide. Provision for detecting and controlling broken force restoration lines may be included. In a second embodiment, a positioning table is disposed in a non-level position wherein gravity tends to produce bearing creep in a downward direction. A loop applying force in the upward direction overcomes the tendency for downward creep. In a further embodiment, a pinion engages racks on the base and the slide. The axis of the pinion is resiliently connected to the retainer to tend to urge the retainer in a direction opposite to a resulting creep.

10 Claims, 6 Drawing Sheets

FIG. IA
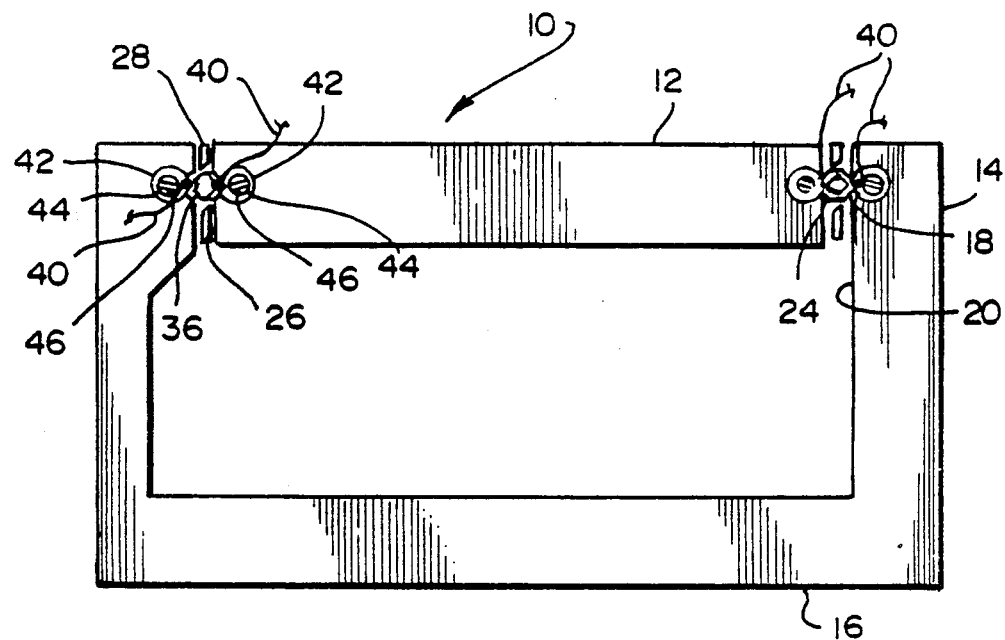
FIG. IB
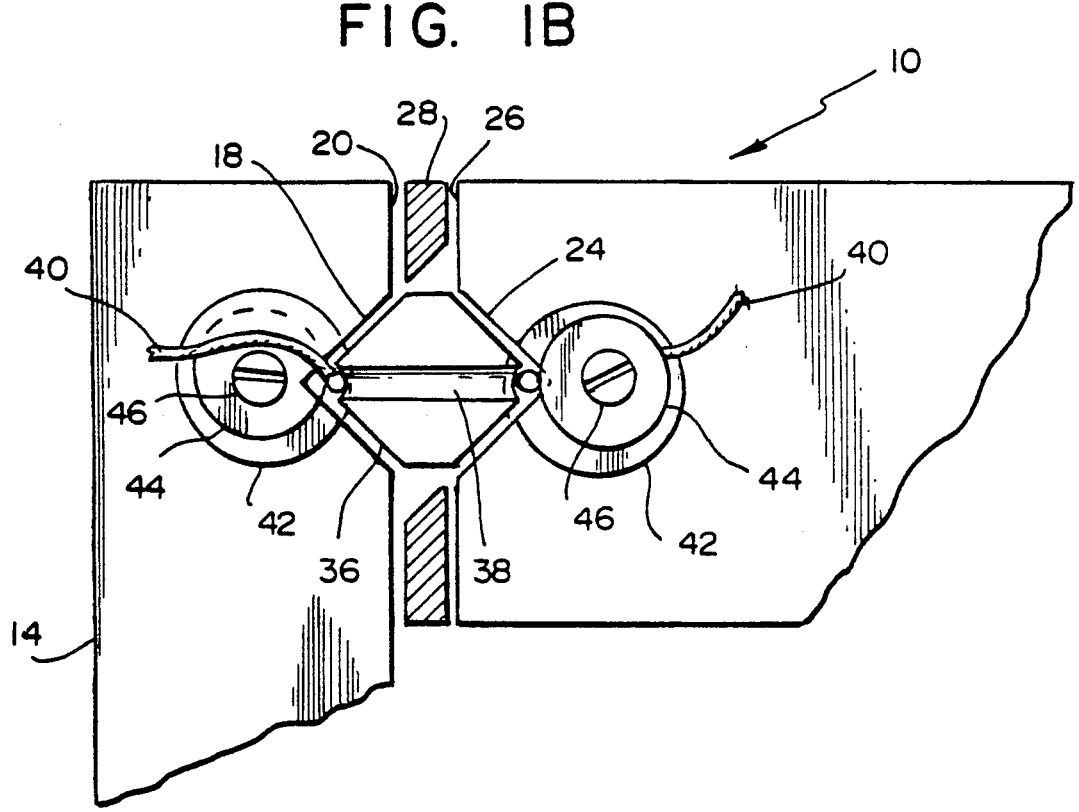

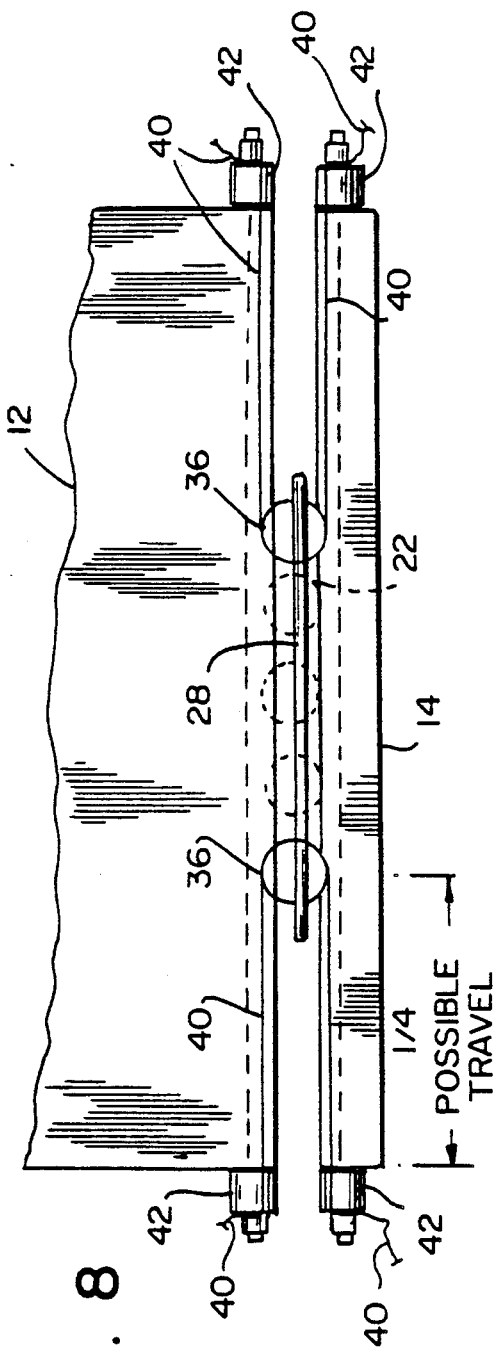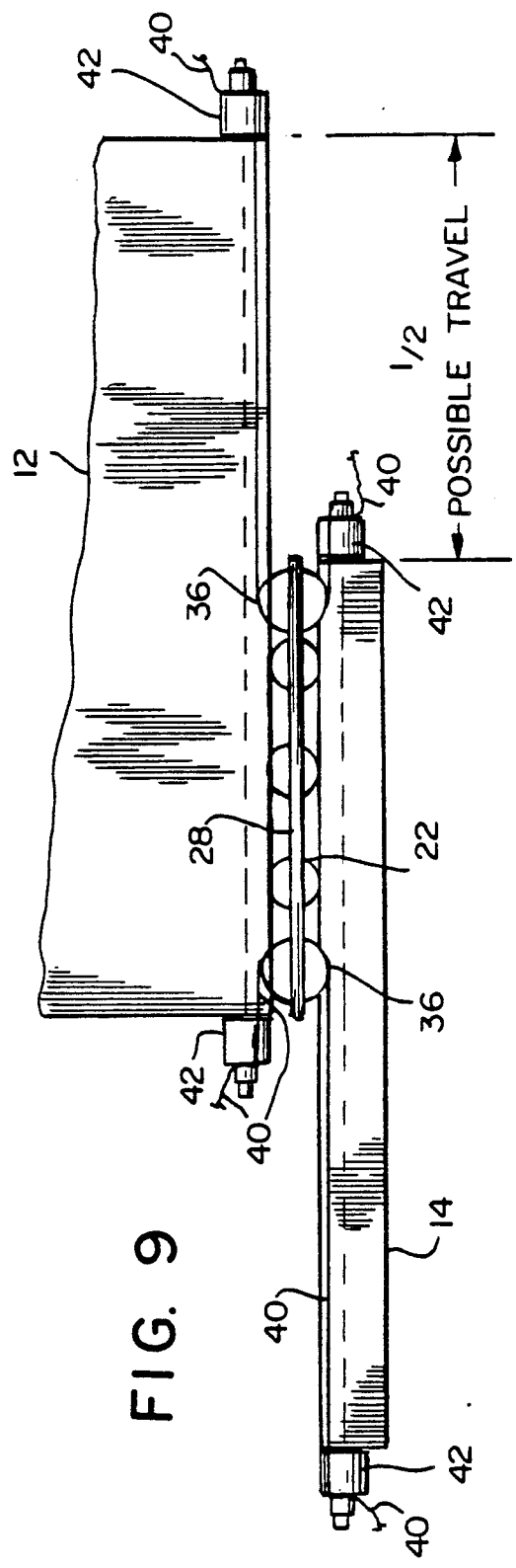

ANTI-CREEP FOR BEARING RETAINERS

BACKGROUND OF THE INVENTION

The present invention relates to positioning tables and more particularly to techniques for controlling the tendency of retainers of positioning table bearings to creep from their ideal positions relative to their path of travel.

The use of positioning tables to enable movement of workpieces or the like back and forth along an axis at controlled rates for precise positioning is well established. Such positioning tables are often used in vertical or slanted positions as well as in apparently level positions.

One type of positioning table employs V-grooves in a U-shaped base that face corresponding V-grooves in the edges of a slide. Ball or roller bearings ride in the V-grooves to permit the slide to move with respect to the base. The base applies a large preload to the bearings to ensure respectable travel of the slide. The bearings on each side of the slide are conventionally held in desired relative positions by a retainer.

The V-grooves in the foregoing device may be machined into the edges of the base and the slide, or they may be machined into separate rails which are affixed facing each other.

Other types of positioning tables employ grooves having cross-sectional shapes of gothic arches, or portions of two circles. Alternatively, instead of using machined shapes, two rods may be affixed to the base, and an additional two rods may be affixed to the base. The rolling bearing elements bear against the rods in a manner analogous to their function with machined shapes.

For purposes of the present invention, all such arrangements are equivalent. The remainder of the discussion of the background, and the detailed description of the invention, is directed to the illustrative example wherein V-grooves are machined into the facing surfaces of the base and the slide, and the rolling bearing elements are balls.

During use, the bearings and their retainer travel half the distance travelled by the slide. The limits of travel of the slide are established by the length of the slide and base. At its limits of travel, the slide overhangs the end of the base, and the end bearing is adjacent the end of the base. The total slide travel is normally equal to twice the length of the slide, minus twice the length of the bearing assembly.

A major problem is the tendency of the bearings to creep from their nominal position with respect to the slide. Such creeping reduces the available travel of the slide. This creeping may result from the use of positioning tables in a non-level position or from manufacturing imperfections such as variations in flatness and straightness of the bearing surfaces of the V-grooves, or imperfections in the bearings.

While the creep may be only a few micro-inches per end-to-end operation of the positioning table, tens of thousands of operations can produce a total creep that seriously reduces the available travel.

To correct such creep, the prior art uses a pinion engaging racks on the base and the slide. The pinion travels half the distance of slide travel, the same as the nominal travel of the bearings. The pinion is connected to the bearing retainer to force the retainer, and its bearings, back to their nominal positions with respect to the slide. This is accomplished by sliding the bearings in the ways.

With a light preload on the bearings, the rack and pinion idea may be satisfactory. However, some positioning tables employ a preload on the bearings on the order of several hundred pounds. The force required to slide the retainer and bearings back to their required positions in such a case may be two hundred pounds. This would place a large burden on the motor driving the slide. In some cases the motor may not be capable of driving the retainers back to their normal position, which may cause motor overheating or the actuation of a fuse or circuit breaker. In these cases, the operator may have to "bang" the retainers back to their normal position or to use a program in an automatic machine to push the retainers. In either case, this banging or pushing may cause premature failure of the bearings, and may cause damage or misadjustment of a sensitive load driven by the stage.

OBJECTS AND SUMMARY OF THE INVENTION

Accordingly, it is an object of the invention to provide a bearing retainer which overcome the drawbacks of the prior art.

It is a further object of the invention to apply a small force to a bearing retainer in a direction effective for urging the bearing retainer, and its bearings, in a direction to overcome creep.

It is a still further object of the invention to apply a small force to a bearing retainer of a positioning table at all positions of the slide with respect to its base, the force being in a direction required to overcome bearing creep.

Briefly stated, the present invention provides apparatus for force restoration of a bearing retainer using a loop of resilient line around a pulley at an end of a bearing retainer. One end of the loop attached to a slide and the other end is attached to a base of a positioning table. A second loop is similarly attached at the opposite end of the retainer. These loops apply equal tension to both ends of the bearing retainer as long as the bearing retainer remains in its proper position without creep. When the bearing retainer moves out of position, unequal forces are exerted by the two loops, with a resultant force in a direction necessary to return the bearing retainer to its proper position. This controls the position of the bearing retainer relative to the slide. Provision for detecting and controlling broken force restoration lines may be included. In a second embodiment, a positioning table is disposed in a non-level position wherein gravity tends to produce bearing creep in a downward direction. A loop applying force in the upward direction overcomes the tendency for downward creep. In a further embodiment, a pinion engages racks on the base and the slide. The axis of the pinion is resiliently connected to the retainer to tend to urge the retainer in a direction opposite to a resulting creep.

According to an embodiment of the invention, there is provided an apparatus for correcting a position of a bearing assembly of a positioning table comprising: a base, a slide, at least a first rolling bearing assembly between the slide in the base, the at least a first rolling bearing assembly including a retainer and a plurality of rolling bearings, at least one flexible line having a first end connected to the base, and second ends connected to the slide, means on the retainer for permitting the flexible line to pass thereover in a loop, and resilient means for applying an initial tension to the at least one flexible line.

According to a feature of the invention, there is provided an apparatus for correcting a position of a bearing assembly of a positioning table comprising: a base, a slide, at least a first bearing assembly between the slide in the base, the at least a first bearing assembly including a retainer and a plurality of rolling bearings, a first flexible line having a first end connected to the base, and a second end connected to the slide, first means on the retainer for permitting the first flexible line to pass thereover in a first loop, first resilient means for applying an initial tension in a first direction to the first flexible line, a second flexible line having a first end connected to the base, and a second end connected to the slide, second means on the retainer for permitting the second flexible line to pass thereover in a second loop, and second resilient means for applying an initial tension in a second direction, opposite to the first direction, to the first flexible line.

According to a further feature of the invention, there is provided a pulley for operation in the V-groove ways of a cross-bearing slide, comprising: first and second circular cones, the first and second circular cones being joined at their bases, a groove at a junction of the bases, and conical surfaces of the first and second circular cones being sized for rolling contact with bearing surfaces of the V-groove ways.

According to a still further feature of the invention, there is provided apparatus for resisting creep in a bearing assembly of a cross-bearing slide of a positioning table, comprising: the positioning table including a base and a slide, the bearing assembly being disposed between the base and the slide, the bearing assembly including a plurality of bearings in a retainer, a flexible line double reeved to the bearing retainer between the base and the slide, means for providing a tension in the line, and means for detecting a loss of the tension, whereby an alarm may be generated.

According to a still further feature of the invention, there is provided an apparatus for correcting a position of a bearing assembly of a positioning table comprising: a base, a slide, at least a first rolling bearing assembly between the slide in the base, the base and slide being positionable in a non-level position in which gravity tends to bias the rolling bearing assembly in a downward direction, whereby creep of the bearing assembly is predominantly in a downward direction, the at least a first rolling bearing assembly including a retainer and a plurality of rolling bearings, at least one flexible line having a first end connected to an upper end of the base, and second ends connected to an upper end of the slide, means on the retainer for permitting the flexible line to pass thereover in a loop, and resilient means for applying a tension to the at least one flexible line, in response to retainer creep.

According to a still further feature of the invention, there is provided an apparatus for correcting a position of a bearing assembly of a positioning table comprising: a base, a slide, at least a first rolling bearing assembly between the slide in the base, the at least a first rolling bearing assembly including a retainer and a plurality of rolling bearings, a first rack on the base, a second rack facing the first rack affixed to move with the slide, a pinion engaging the first rack and the second rack, and resilient means for connecting the pinion to the retainer, whereby a restoring force is produced in the presence of creep of the bearing assembly.

The above and other objects and advantages of the present invention will become apparent from the following description read in conjunction with the accompanying drawings, in which like reference numerals designate the same element.

BRIEF DESCRIPTION OF THE DRAWINGS

FIG. 1A is an end view of a positioning table including an anti-creep device according to an embodiment of the invention.

FIG. 1B is a portion of the invention of FIG. 1A enlarged for clarity.

FIG. 8 is a representation of the present invention with its slide in a center position.

FIG. 9 is a representation of the present invention with its slide in an extended position.

DETAILED DESCRIPTION OF THE PREFERRED EMBODIMENT

Figure 2A:
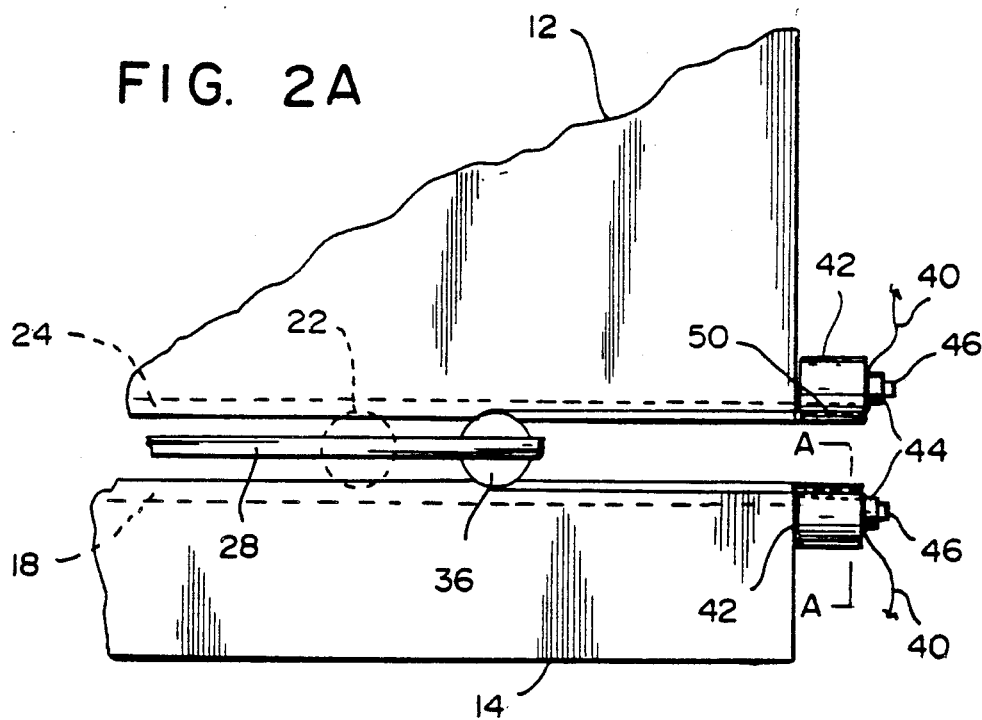
FIG. 2A is a plan view of a portion of the positioning table of FIG. 1.

Referring to FIGS. 1A and 2A, a positioning table 10 includes a slide 12 suspended between upper portions of side walls 14 in a U-shaped base 16. Opposing base V-grooves 18 are disposed along inner surfaces 20 of side walls 14 to form outer races for ball bearings 22. Inner races for ball bearings 22 are formed by slide V-grooves 24 disposed along each side 26 of slide 12 facing base V-grooves 18. Retainers 28 retain the individual balls 30 of ball bearings 22 at predetermined spacings.

Figure 3:
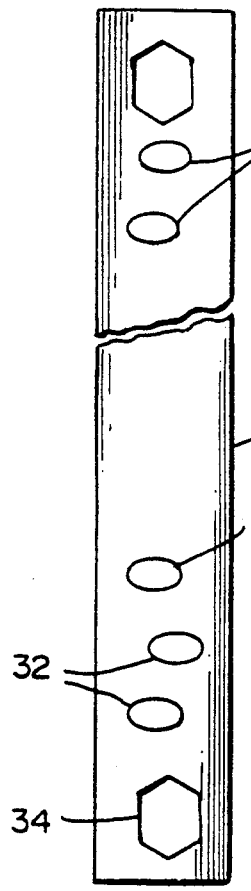
FIG. 3 is an outline drawing of a bearing retainer.

Referring to FIG. 3, each retainer 28, which may be brass or other suitable low friction material, contains a plurality of retainer holes 32 to maintain the relative positions of individual balls 30 in ball bearings 22. A special pulley positions 34 is located at each end of retainer 28.

Referring to FIGS. 1B and 2A, a pulley 36 is positioned at both ends of retainers 28. Each pulley 36, depicted in FIG. 4, has the shape of two frustums of cones with an annular groove 38 at their adjoining bases. The conical surfaces of pulleys 36 bear against the four surfaces of the facing V-grooves 18 and 24.

A first end of a resilient line 40 is connected to a cylindrical holder 42 at one end of slide 12 by a washer 44 and a screw 46. Each holder 42 has a hole 50 through which line 40 is threaded. Each line 40 is looped around annular groove 38 of its respective pulley 36 and its second end is threaded through hole 50 of its corresponding holder 42 at the corner of slide 12 and secured by washer 44 and screw 46. Each edge of slide 12 has two resilient lines 40 pulling in opposite directions, for a total of four lines looped over four respective pulleys 36.

Resilient lines 40 can be successfully fabricated from a variety of materials, such as an acrylic used for fishing lines, or a KEVLAR or graphite epoxy wire stretched to provide a required resilience. Resilient lines 40 may also be very thin wires or very thin wire strands twisted together. When the diameter of wire is very small relative to its length, a suitable resilience will result.

Figure 2B:
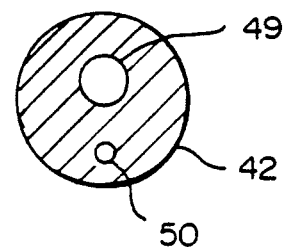
FIG. 2B is a cross section of holder 42, taken at line AA of FIG. 2A.

FIG. 2B is a cross sectional view of holder 42 taken at line AA of FIG. 2A. This figure shows the relative positions of hole 50, through which line 40 is threaded and a screw hole 49 for screw 46.

Referring again to FIGS. 1B and 2A, as slide 12 moves back and forth, ball bearings 22 move half as far. The two-part reeving of resilient line 40 ensures that, in the absence of creep, an initial tension in resilient lines 40 is maintained at all positions of slide 12.

If ball bearings 22 creep from a position which would be attained in normal operation, resilient lines 40 pulling in the direction of creep lose tension, while resilient lines 40 pulling away from the direction of creep are tightened. The unbalanced forces work through the respective pulleys 36 to urge ball bearings 22 in a direction to offset the creep.

Initially, it was the perception of the inventor, as a representative of those skilled in the art, that resilient lines 40 would be required to exert enough force to slide ball bearings 22 against their friction with the V-grooves. This turned out to be incorrect. Calculations indicated that, on a test machine, a force exceeding a hundred pounds would be required to slide ball bearings 22 without rolling. In a test, resilient lines 40 were fabricated from conventional plastic fishing line of a strength identified as "20-pound test". A nominal initial tension of about 5 pounds was placed on each resilient line 40. After several thousand end-to-end operations of a positioning slide, no discernable creep was found in the slide. In addition, the initial equality of tension opposed directions of travel was found to be undisturbed. In a comparison test on the same positioning table, but without resilient lines 40, creep displaced the slides about 0.25 inches. It is believed that further operations without resilient lines 40 would have resulted in additional creep.

In a further test, a plastic fishing line of 100-pound test was substituted for the 20-pound test line. This line broke after only a few hundred end-to-end operations. Although the scope of the invention should not rely on a theory of operation, it is believed that the very short life of the higher-strength line may have been due to increased bending stresses produced by its thicker cross section as it passes over the small diameter of pulleys 36. A further possibility may be that the stronger line had poorer resilience, and was therefore unable to withstand creep-derived forces as well as the weaker line.

The success of the weaker resilient line 40 may be attributed to the small, but constant, restoring force developed at all positions of slide 12.

Figure 5:
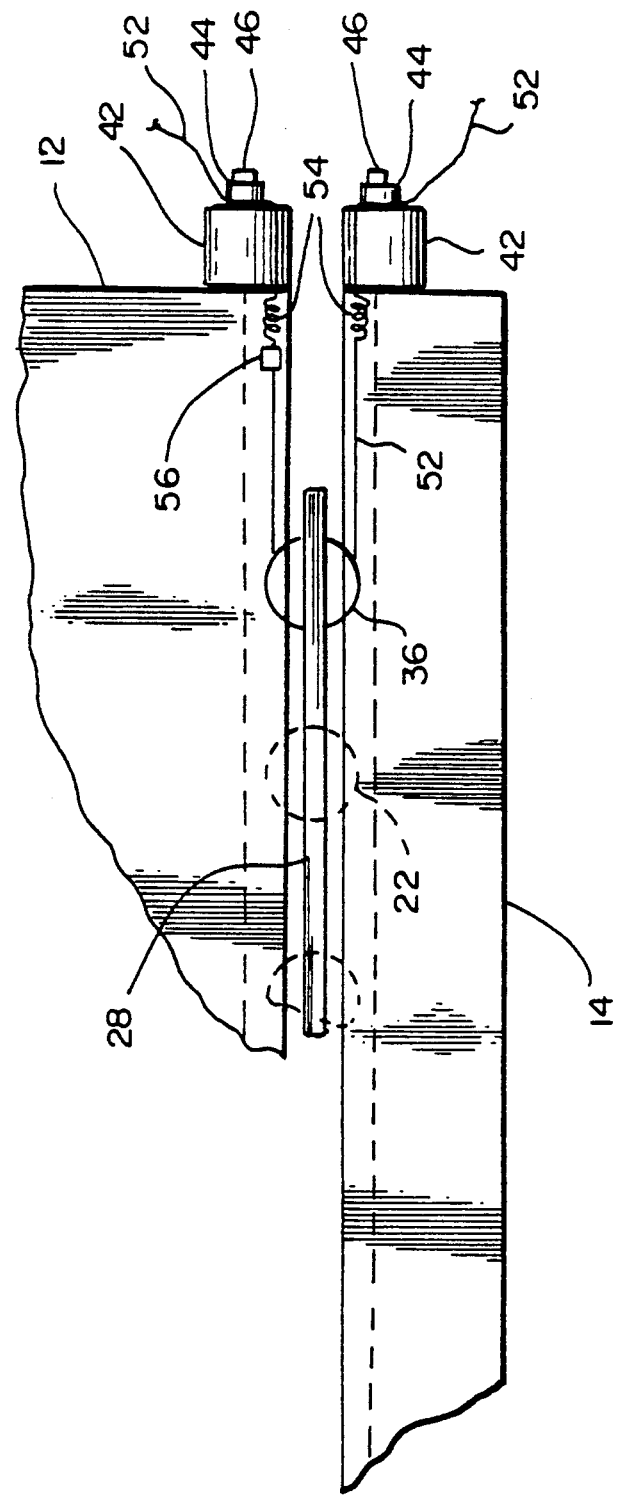
FIG. 5 is another embodiment of the invention showing the use of non-resilient wire and two springs in place of resilient line.

Referring to FIGS. 5, there is shown a second embodiment of the invention. In this embodiment, resilient lines 40 are replaced by non-resilient metal wire lines 52 having resilience added by using a wire spring or springs 54. This embodiment can use either one or two springs 54 effectively. FIG. 5 shows the use of wire line 52 having a spring 54 at each end. A wire line 52 having a single spring 54 at one end may be used. The resilience of springs 54 substitutes for the resilience of resilient lines 40 in the prior embodiment. The operation of this embodiment is the same as in the prior embodiment.

If a line 52 (or 40) should break, the resulting unbalanced forces may be capable of creating creep in bearings 22. A tension detector 56, shown in this embodiment, may be employed to detect the loss of tension and trigger an alarm.

Figure 6:
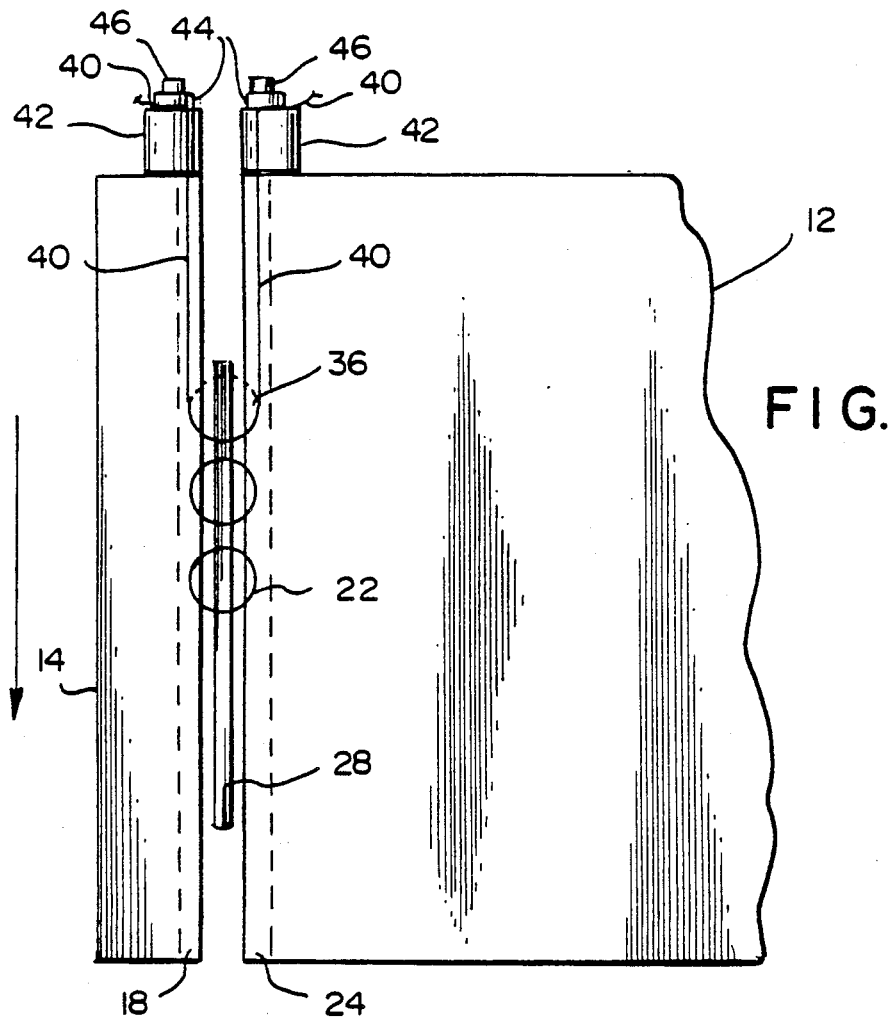
FIG. 6 shows yet another embodiment of the invention adapted for a positioning table oriented for vertical operation.

Referring to FIG. 6, there is shown a positioning table that is made for vertical operation. The operation of this embodiment is identical to that described for FIG. 1A, except that an anchor line 40 and its supporting parts are used to apply equalizing tension to a ball bearing 22 in an upward direction only. Tension applied to ball bearing 22 in a downward direction by gravity eliminates the need for a downward tensioning anchor line 40.

Slide 12 of any of the above embodiments may be driven by an electric motor through any conventional means (not shown) such as, for example, by a direct friction drive or a lead screw.

Figure 4:
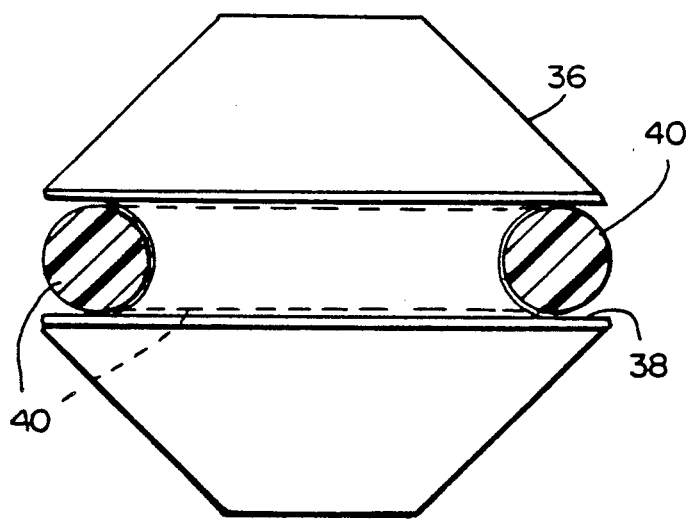
FIG. 4 is an outline drawing of a pulley.
Figure 7:
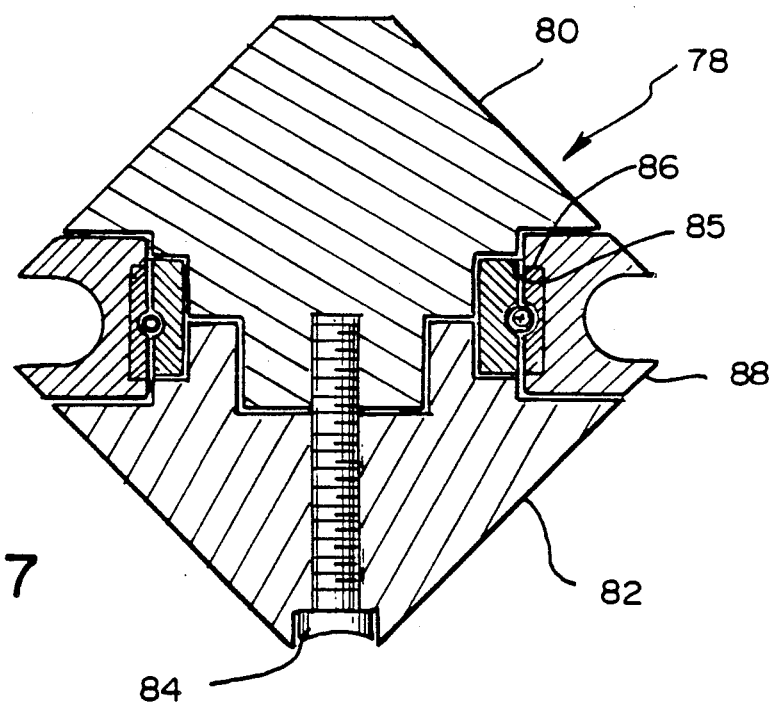
FIG. 7 is a cross section a pulley that incorporates a ball bearing to reduce the friction load to anchor lines of the invention.

Referring to FIG. 7, there is shown an embodiment of a pulley 78, which may be substituted for pulley 36 shown in FIG. 4 when reduced pulley friction is desired. As shown in the figure, the body of pulley 78 is divided into two parts, a threaded part 80 and a screw part 82 which are held together by a screw 84. A compound annular groove 85 is formed at the junction of threaded part 80 and screw part 82. An inner ring of compound annular groove 85 houses a ball bearing 86, on which travels a grooved ring 88.

When used in place of pulley 36, pulley 78 supports an anchor line 40 in grooved ring 88, which can rotate freely around pulley 36 to equalize the tension on both ends of anchor line 40 independently of the motion of the body of pulley 78. Pulley 78 may be preferred in the embodiment of the invention in FIG. 5B in which a substantially non-resilient line 52 is used with a single spring 56. The tension of spring 56 is distributed to line 52 on both sides of pulley 78 without the slipping of line 52 as may be required without the free rotation permitted by ball bearing 86. One skilled in the art will recognize that a sliding bearing may be substituted for ball bearing 86 without departing from the spirit and scope of the invention.

Referring to FIG. 8, slide 12 is shown in its centered position. Ball bearing 22 in retainer 28 are centered on side wall 14 and lines 40 extend equally on both ends from pulleys 36 to holders 42 on the ends of slide 12 and side wall 14 and tension on both ends of retainer 28 are substantially equal.

Referring to FIG. 9, as slide 12 is driven away from the center position in either direction, line 40 on the forward end of slide 12 extends away from retainer 28, while line 40 on the trailing end of slide 12 retracts toward retainer 28. Because of the two-part reeving of lines 40, in the absence of creep, equal tension is maintained on both ends of retainer 28 at all positions of slide 12.

It can be seen that, as long as the movement of each ball bearing 22 is equal to half the movement of slide 12, the opposing tensions exerted on the ends of retainer 28 by lines 40 remain equal. However, if the movement of ball bearing 22 is not to equal half the movement of slide 12, the tension exerted by line 40 in a direction opposing the error increases while the tension exerted by line 40 in the direction of the error reduces, thus providing a small, constant restoring force in the direction opposing creep. This small restoring force, although it is far less than the force required to move the retainer and bearings by brute force, is sufficient to keep retainer 28 in its correct position, within the ability of the inventor to measure an error in position. As a consequence, it can be asserted that the present invention prevents ball bearings 22 and retainer 28 from creeping.

Figure 10A:
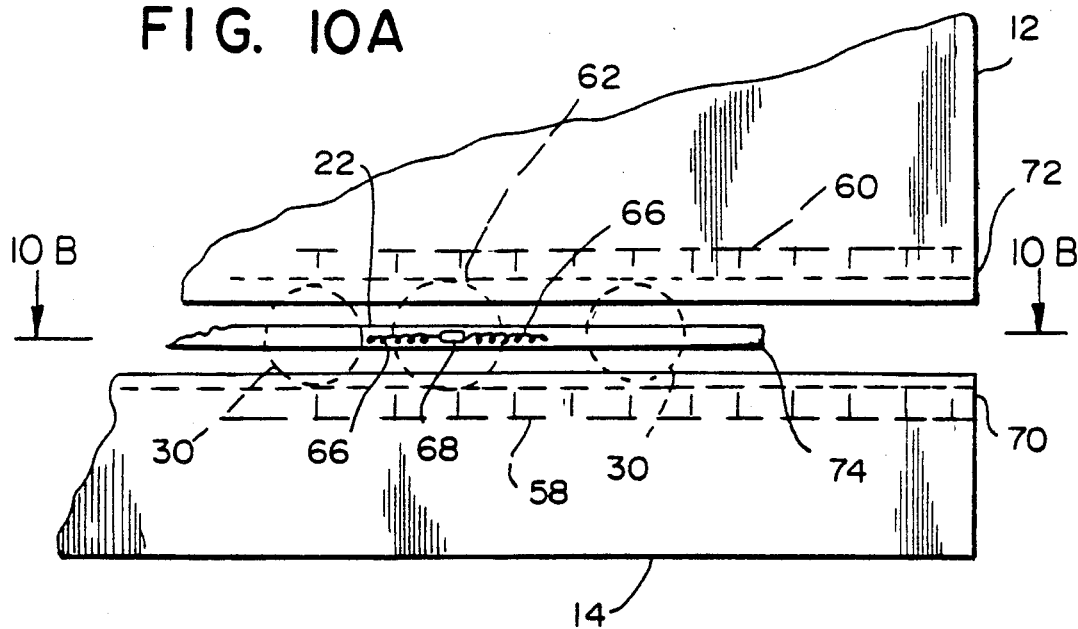
FIG. 10A shows still another embodiment of the invention, wherein a rack and pinion is connected to a bearing retainer by resilient devices.
Figure 10B:
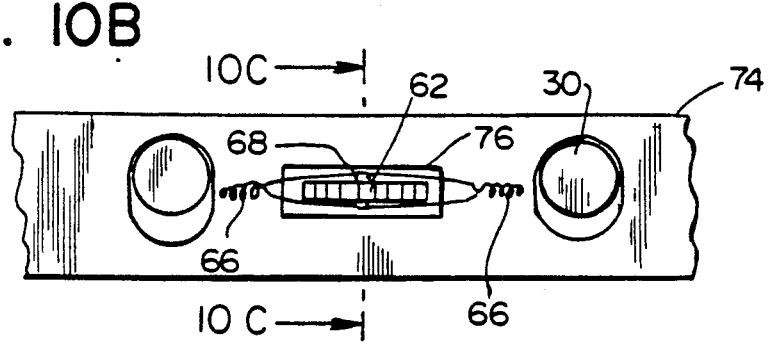
FIG. 10B. is a longitudinal section of the embodiment of 10A taken along line BB.
Figure 10C:
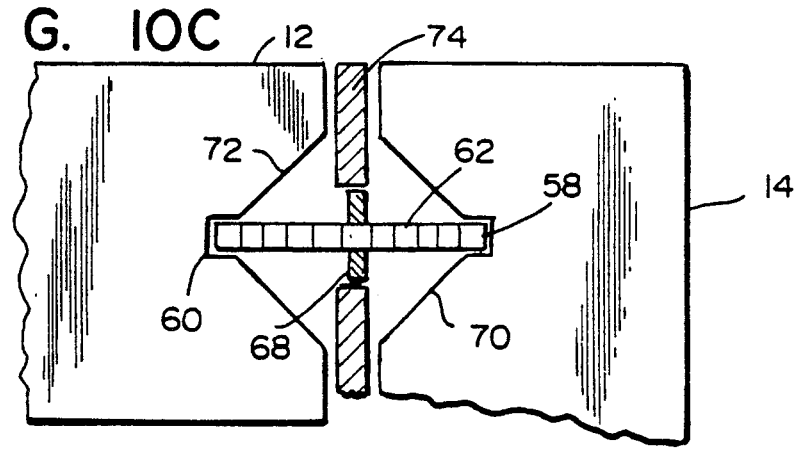
FIG. 10C is a cross section of the embodiment of 10B taken along line CC.

Referring to FIGS. 10A, 10B, and 10C, a further embodiment of the invention employs a wall rack 58, that is recessed into a wall bearing groove 70, and an opposing slide rack 60, that is recessed into a slide bearing groove 72 so that wall rack 58 and slide rack 60 are aligned with the path of travel of retainer 74.

A pinion gear 62 is centered by an axle 68 in a pinion retainer slot 76 of a retainer 74. In this manner, pinion gear 62 mates with wall rack 58, and slide rack 60, while ball bearings 22 ride along wall bearing groove 70 and slide bearing groove 72, which form the races for ball bearing 22.

A pair of opposing resilient members such as, for example, springs 66, are connected in opposite directions from the axis of pinion gear 62 and retainer 74. These resilient members, which may be, for example, wire springs, coil springs, flat springs or resilient rubber, exert equal pressure on retainer 74 in both directions tending to longitudinally center pinion gear 62 in pinion retainer slot 76.

During operation, if ball bearing 22 tends to creep in either direction with respect to pinion gear 62, the tension exerted by springs 66 increases in a direction opposite the creep and decreased in the direction of the creep to maintain the relative positions of retainer 74 and pinion gear 62.

This arrangement also improves over the prior art where a retainer is fixed to a pinion as described earlier, because the action of springs 66 in this embodiment minimizes the affects of backlash in the gears. While in this embodiment the rack and pinion arrangement is essentially concentric with the ball bearing, other arrangements are possible, for example, racks and a pinion gear may be placed above or below a ball bearing between a slide and base of a positioning table, as long as resilient coupling to the ball bearing is possible.

The descriptions of the preferred embodiments given above, the invention is described in relation to positioning tables whose slides move in straight paths back and forth. However, the invention is equally effective in preventing bearing retainer creep in rotary positioning tables with limited angular travel. In such a rotary positioning table curved bearing retainers are placed between curved surfaces of a rotary slide and base, centered in the arc of travel of the slide at both sides. These retainers are subject to the same creep as those used in linear tables. The present invention is equally capable if opposing creep in rotary tables. The manner for doing so is the same as for linear tables, and thus detailed explanation thereof is unnecessary to enable one skilled in the art to make and use the invention in the rotary table environment.

While embodiments discussed and illustrated use ball bearings between V-shaped bearing grooves, crossed roller bearings would work equally well in these V-shaped bearing grooves. When ball bearings are used, bearing grooves are not restricted to V-shapes. The bearing grooves can be circular or gothic arch in cross section. Ball bearings are equally operable between two pairs of parallel rods.

Commonly, separate opposing pairs of rails having bearing grooves are screwed onto positioning table slides and bases in place of built-in bearing grooves. This offers the advantage of simple replacement of a damaged or faulty bearing groove. The present invention is equally effective in controlling bearing retainer creep in these bearing installations.

Having described preferred embodiments of the invention with reference to the accompanying drawings, it is to be understood that the invention is not limited to the precise embodiments and that various changes and modifications may be affected therein by one skilled in the art without departing from the scope or spirit of the invention which is limited only by the appended claims.

What is claimed is:

1. An apparatus for correcting a position of a bearing assembly of a positioning table comprising:
   a base;
   a slide;
   at least a first rolling bearing assembly between said slide in said base;
   said at least a first rolling bearing assembly including a retainer and a plurality of rolling bearings;
   at least one flexible line having a first end connected to said base, and second ends connected to said slide;
   means on said retainer for permitting said flexible line to pass thereover in a loop; and
   resilient means for applying a tension to said at least one flexible line in a direction to oppose retainer creep.

2. Apparatus according to claim 1 wherein:
   flexible line includes a resilient flexible line; and
   said resilient means includes a resilience of said flexible line.

3. Apparatus according to claim 1, wherein said resilient means includes at least one spring.

4. Apparatus according to claim 3, wherein said at least one spring is connected between an end of said flexible line and one of said base and said slide.

5. Apparatus according to claim 3, wherein said flexible line is substantially non-resilient.

6. An apparatus according to claim 1, wherein said means on said retainer includes:
   a pulley; and
   said pulley including a groove therein for permitting said flexible line to pass thereover.

7. An apparatus according to claim 6, wherein said pulley contacts the same bearing ways as said plurality of rolling members.

8. An apparatus according to claim 6, wherein:
   said pulley includes two frustums of cones mated at their bases; and
   said groove being disposed at the mating line of said bases.

9. An apparatus for correcting a position of a bearing assembly of a positioning table comprising:
   a base;
   a slide;
   at least a first bearing assembly between said slide in said base;
   said at least a first bearing assembly including a retainer and a plurality of rolling bearings;
   a first flexible line having a first end connected to said base, and a second end connected to said slide;

first means on said retainer for permitting said first flexible line to pass thereover in a first loop;

first resilient means for applying a tension in a first direction to said first flexible line, in a direction top oppose creep;

a second flexible line having a first end connected to said base, and a second end connected to said slide;

second means on said retainer for permitting said second flexible line to pass thereover in a second loop; and second resilient means for applying an initial tension in a second direction, opposite to said first direction, to said first flexible line.

10. Apparatus according to claim 9, wherein said at least a first bearing assembly includes a first bearing assembly between a first side of said slide and said base, and a second bearing assembly between a second side of said slide and said base.

* * * * *